United States Patent [19]

Parliment

[11] 4,018,934
[45] Apr. 19, 1977

[54] STABILIZATION OF IRON - COMPLEX COLORS

[75] Inventor: Thomas Holden Parliment, New City, N.Y.

[73] Assignee: General Foods Corporation, White Plains, N.Y.

[22] Filed: Aug. 25, 1975

[21] Appl. No.: 607,321

[52] U.S. Cl. .............................. 426/540; 426/250
[51] Int. Cl.$^2$ ........................................ A23L 1/27
[58] Field of Search ..................... 426/250, 540; 260/345.9

[56] References Cited

UNITED STATES PATENTS 3,397,063  8/1968  Carlson et al. .................... 426/540
3,655,406  4/1972  Klaui ................................. 426/540

OTHER PUBLICATIONS

Chemical Abstracts, vol. 75, 1971, 115362k, Synthesis of Maltol–Iron (III) Complexes, Kidani et al.

Primary Examiner—Jeanette M. Hunter
Attorney, Agent, or Firm—Thaddius J. Carvis; Daniel J. Donovan; Bruno P. Struzzi

[57] ABSTRACT

Iron-complex colorants for use in dry food mixes are stabilized by co-drying either the ferric ion compound of the color complex or the entire iron - complex itself on a non-toxic inert diluent.

13 Claims, No Drawings

4,018,934

STABILIZATION OF IRON - COMPLEX COLORS

BACKGROUND OF THE INVENTION

The present invention relates to a method whereby colors derived from iron complexes and which are to be employed in dry foods or in dry mixes for liquid systems are stabilized without loss of color hue in the dry color powder or in the product units which the stabilized iron color complex is incorporated. More specifically, the immediate invention concerns co-drying either the ferric ion component of the color complex or the entire complex on an edible inert diluent to obtain such a result.

It is known that ferric salts form complexes with certain phenols to produce deep colors as those employed in ink. Recently it has been discovered that certain α-hydroxy carboxylic acids as well as certain of their ethers and esters and 3 or 5-hydroxy-4-pyrone-structured compounds such as 3 hydroxy-2-methyl-4-pyrone, known commercially as "Maltol," complex with ferric ions to form yellow and red to burgundy colors respectively. These colors are the inventive disclosures of two patent applications being filed concurrently with the immediate invention herein incorporated by reference. Both applications are entitled "New Color Composition." The application relating to red color complexes is authored by Dr. Richard Scarpellino, General Foods Corporation, Ser. No. 607,409. The application relating to yellow color complexes is by Dr. Thomas H. Parliment, General Foods Corporation, now U.S. Pat. No. 3,974,197.

It has been found that iron complex colors such as those formed by iron-phenol complexes, iron-maltol complexes and iron α-hydroxy carboxylic acid complexes are very hygroscopic due it is thought to the presence of the ferric ion. When employed in dry food systems, these complexes tend to form small sticky spots on the surface of the dry mix on storage with some color loss if the reaction is allowed to run rampant. In addition, oftentimes the food system in which these colors are to be employed must be reformulated to delete ingredients which would preferentially complex with the ferric ion resulting in appreciable if not total color loss. This invention provides a method of stabilizing iron complex colors whereby formation of these spots and consequent color loss is prevented and reformulation of the food system is in some instances not necessary, making these color complexes more suitable for use in virtually any dry food or beverage mixes which are normally packaged and stored for extended periods of time.

SUMMARY OF THE INVENTION

I have found that by co-drying either the ferric ion component or both components of the iron complex color together on an edible inert diluent such as a water soluble carbohydrate, the color complex is stabilized; that is, the problem of color loss due both to the hygroscopicity of the iron and the reactions taking place between the color complex and different ingredients of a dry food or beverage mix is alleviated. Specifically, whenever the ferric iron source is co-dried with an edible inert diluent and then combined with the color-forming α-hydroxy carboxylic acid, phenol, maltol or the like, a stable colorless powder is obtained which is both non-hygroscopic and devoid of any tendency to react with other ingredients of a dry food or beverage mix such that reaction spots are produced. Conversely, when both the ferric ion source and the color-forming component are admixed with such a diluent and a solution thereof is co-dried, a colored powder is produced with the aforementioned stability properties.

The problems encountered in the use of iron-complex colors as discussed in the aforementioned co-pending applications are two-fold. Firstly, readily soluble sources of ferric ion are relatively hygroscopic and as such present stability and color loss problems when the color complex is stored alone or in the confines of a dry food or beverage mix. Secondly, ferric ions interact with food ingredients especially acids known in the art to preferentially complex with iron such that the color complex is destroyed and loss of color or ability to produce color ensues even in a "dry" environment. Consequently, this has necessitated reformulation of these food systems to delete such reducing or sequestering agents.

The immediate invention provides a means whereby the stability of the color complex is increased and the need for reformulation of the dry foodstuff is lessened. However, where reformulation is still essential is in dry mixes which eventually will be liquified. Since on dissolution the protective coating surrounding the ferric ion is removed, interaction between the ferric ion and preferential sequestering agent can still take place. Therefore, the added advantage of doing away with the need to reformulate a product applies essentially to dry mixes and dry foodstuffs consumed in the dry state.

Accordingly, the principal object of this invention is to provide improved iron-complex colors by virtue of this decreased hygroscopicity when stored in the dry state.

A further object of this invention is to obviate the need to reformulate dry foodstuffs and dry mixes consumed in the dry state which conventionally contain preferential sequestering agents which would normally interact with the ferric ion such that the color would either not be formed or would be at least lessened once so formed.

An additional object of this invention is to provide iron complex color-containing dry mixes of improved appearance by virtue of the absence of reaction spots on the surface of these mixes.

These and additional objects of the present invention will be more apparent from the forthcoming detailed description of the invention as defined by the appended claims.

DETAILED DESCRIPTION OF THE INVENTION

The stability of iron-complex colors can be significantly increased and their reactivity with added reducing and sequestering ingredients of dry food and dry beverage mixes appreciably reduced by co-drying an aqueous solution of either the ferric ion source or the entire color complex on an inert edible bulking agent or diluent.

The solid edible bulking agents for use in this invention are those non-toxic substances which are known in the art as inert, i.e. they do not preferentially complex with iron. Exemplary of these are gums, such as gum arabic, gum ghatti, CMC, xanthan gum and the like, corn syrup solids, e.g. dextrins, and the polymaltodextrins, polyglucose, hydrolysates such as protein hydrolysates, inert sugars and the like. The solubiltiy of these bulking agents in aqueous based systems is only relevant where the dry color-complexes of the immediate invention are to be employed in primarily moist or liquid systems. Therefore, this invention is intended to comprehend both water soluble and insoluble edible inert bulking agents. Those compounds traditionally employed in the art as bulking agents but which are also capable of preferentially sequestering the ferric ion or reducing the ferric ion to the ferrous ion state must not be employed since in either instance this results in a total loss of color or ability to produce color when the iron source is combined with the phenol, maltol, $\alpha$-hydroxy carboxylic acid or the like. Exemplary of such unsuitable bulking agents are citric acid, fumaric acid, adipic acid and the phosphates to mention just a few.

The mechanism of this invention is not immediately understood but it has been determined that the essentialities of this invention rest in the ferric ion source as for example, a ferric salt being co-dried with the non-reactive bulking agent such that the ferric ion is encased in a non-reactive protective shield. It is the ferric ion component of the color complex which poses the problems of hygroscopicity and reactivity and therefore, any modification or variation of the immediate invention which would in effect bind the ferric ion is comprehended within this invention.

What is indeed novel over the iron complex colors of record is both the addition of an edible inert diluent and the fact that when co-dried with the ferric ion or entire color complexes of the immediate invention, the resultant composition may be stored for extended periods of time without loss of color or ability to produce color and without the formation of unsightly spots.

The degree of stability increase in terms of retention of flowability and absence of reaction spots is indeed significant when evaluated in closed-container systems. For example, an evaluation of the stability of these color complexes was made in both open and closed containers, the latter being a glass stoppered Erlmeyer flask. A 10:1 weight ratio of Mor-rex to ferric chloride/maltol was prepared whereby an aqueous solution containing these components was freeze dried. An identical amount of ferric chloride and maltol was placed in solution and similarly dried. Each co-dried colored powder was combined with typical ingredients of a dry beverage mix i.e. sugar, acid and flavor. This mixture was divided into 2 equal parts, 1 portion stored in an open container and the other in the glass-stoppered flask, the storage conditions in all instances being room temperature, standard atmospheric pressure with naturally occurring humidity variations. Periodic evaluations were made, to determine at what point in time the flowability of the powder was adversely affected due to hygroscopicity and at what time reaction spots began to appear.

As is evident from the above data, even the open container test sample had an unexpectedly superior stability considering the fact it was subjected to the varying humidity conditions of the atmosphere. In fact, in this particular stability study, the open container test sample was over 2,000 times better than the control in terms of longer-lasting stability. Conversely, the closed system test sample at the time of this application was at least 1400 times more stable than the respective control. It should be noted however, that the hygroscopicity of the particular system will vary significantly with the overall humidity of the area. Thus, for example, while generalizations that the stabilized iron complex colors of the present invention will always be stable for 6 months in open containers would not be justified, the improvement in all instances in the overall stability due to the ferric ion or entire color complex having been co-dried with the edible inert diluent is so appreciable as to be unexpected.

The drying methods which may be employed in this invention are typically those methods known in the art to accomplish the desired result. Thus, spray drying, freeze-drying, drum drying (including by vacuum), air drying and various modifications thereof may be employed, the drying temperature not being critical. However, those skilled in the art will be aware that certain inert ingredients with which the ferric ion may be co-dried, depending upon the type of product, might be sensitive to heat. Accordingly, the skilled artisan will employ those drying methods having the least deleterious effect on such ingredients.

What has been established as critical is the molar amount of diluent to be employed relative to the concentration of ferric ion or more broadly, ferric salt present, such that a decrease in hygroscopicity and increase in stability be achieved. This has been determined to be at least an equimolar amount of diluent or combination of diluents to the ferric ion source, a respective 3:1 molar ratio considered optimum. While molar ratios as high as 10:1 of diluent to ferric salt respectively may be employed, molar ratios appreciably greater than this are not considered necessary. Consequently, while a 1:1 to about 10:1 molar ratio of diluent to ferric ion source is operative a ratio of about 2:1 to about 8:1 is considered better with 3:1 considered optimum.

The present invention is applicable to the coloring of virtually any foodstuff including animal food, be it dry, soft-moist, or canned. However, since the major problems encountered with these colors are met in typical dry food and beverage mixes, this invention will find particular application therein.

The particular point at which the coloring material of this invention is incorporated into the foodstuff is not

TABLE I

| | STABILITY DETERMINATION OF THE IRON COMPLEX COLORS | |
|---|---|---|
| | Closed Container | Open Container |
| Control | After 4 to 6 hours, black spots appeared. Fair to poor flowability. | After about 2 hours, the powder was appreciably hygroscopic with an onset of spot formation. |
| Test Sample | Excellent flowability + no reaction spots after 1 year. | Hygroscopicity, + reaction spots began to appear after about 6 months. | critical nor, as mentioned previously, is the particular type of food itself. Typically, the coloring material will be added as a source ingredient to the food or beverage mixture. Where the improved coloring agents of the present invention are to be employed in meat analog systems, pet foods and the like as where, for example, vegetable protein is prepared by extrusion/expansion and is employed as a component of the foodstuff, it may be more desirable to add the coloring after extrusion e.g., by infusion of a colored solution or coating with the color complex.

The following examples illustrate the best mode of practicing this invention.

EXAMPLE I

A dry, colorless powder for use in dry food and beverage mixes was prepared by combining and thereafter homogeneously blending a 1:10 molar ratio of ferric chloride to Mor-rex respectively. This dry mix was placed in solution and freeze-dried. Forty milligrams (40 mg.) of the freeze-dried expanded composition were blended with 4.5 mg. of Maltol to give a dry, colorless ferric ion/comples powder.

This sample is compared in terms of stability to a co-dried composition containing the same weight ratio of ferric chloride to Maltol (about 1:1) but devoid of diluent co-dried therewith. Equal samples are placed in sealed jars and periodic observations made after 1, 2 and 3 week periods. After about 1 day, the sample devoid of diluent shows small, sticky spots on the surface of the dry powder. In the Mor-rex containing sample, no evidence of reaction spots are noted after 1 year.

EXAMPLE II

The same samples were prepared as in Example I, except that instead of adding Maltol to the freeze-dried ferric chloride/morrex mixture, Maltol was added at the same molar concentration prior to freeze drying, which resulted in a dry red powder. On comparison with the same control as in Example I, virtually the same improvements in stability were noted after the same period of time.

What is claimed is:

1. An improved method of preparing iron-complex colors comprised of a ferric ion component and a non-ferric component selected from the group consisting of those phenols, α-hydroxy carboxylic acids, esters of α-hydroxy carboxylic acids, ethers of α-hydroxy carboxylic acids, 3-hydroxy-4-pyrone-structured compounds, and 5-hydroxy-4-pyrone-structured compounds effective to complex with said ferric ion to produce an iron-complex color, wherein the improvement comprises:

a. forming one ferric ion component by preparing a solution comprising the ferric ion component and at least an equal weight amount of an edible inert diluent; and
b. co-drying the solution.

2. The method of claim 1 wherein the ferric ion component is present at a minor amount and the edible inert diluent is present in major amount.

3. The method of claim 1 wherein the edible inert diluent is selected from the group consisting of gum arabic, gum ghatti, carboxymethyl cellulose, xanthan gum, corn syrup solids, inert sugars, protein hydrolysates and the like.

4. The method of claim 1 wherein the ferric ion component is complexed with the non-ferric color component prior to drying.

5. The method of claim 1 wherein the ferric ion component is a ferric salt.

6. The method of claim 1 wherein the ferric salt is selected from the group consisting of ferric chloride, ferric nitrate, ferric sulfate and combinations thereof.

7. The method of claim 1 wherein co-drying is accomplished by freeze drying.

8. The method of claim 1 wherein co-drying is accomplished by spray drying.

9. An improved iron-complex color composition comprised of a ferric ion component and a non-ferric color component selected from the group consisting of those phenols, α-hydroxy carboxylic acids, esters of α-hydroxy carboxylic acids, ethers of α-hydroxy carboxylic acids, 3-hydroxy-4-pyrone-structured compounds, and 5-hydroxy-4-pyrone-structured compounds effective to complex with ferric ion to produce an iron-complex color, the color composition having longer-lasting stability and reduced hygroscopicity wherein the ferric ion component is encased in a non-reactive, non-toxic inert diluent present at a concentration which is at least equimolar to the amount of ferric ion component present.

10. The composition of claim 9 wherein the ferric ion component and diluent are at a respective ratio of about 1:1 to about 1:10.

11. The composition of claim 9 wherein the edible inert diluent is selected from the group consisting of gum arabic, gum ghatti, carboxymethyl cellulose, xanthan gum, corn syrup solids, inert sugars, protein hydrolysates and the like.

12. The composition of claim 9 wherein the ferric ion component is a ferric salt.

13. The composition of claim 12 wherein the ferric salt is selected from the group consisting of ferric chloride, ferric nitrate, ferric sulfate and combinations thereof.

* * * * *